United States Patent
Samson et al.

(10) Patent No.: US 7,318,370 B2
(45) Date of Patent: Jan. 15, 2008

(54) TIE ROD FOR BOOSTER AND BOOSTER COMPRISING SUCH A TIE ROD

(75) Inventors: Gwenael Samson, Paris (FR); Jean-Pierre Michon, Saint Pathus (FR); Francisco Luengo, Aulnay Sous Bois (FR)

(73) Assignee: Robert Bosch GmbH, Stuttgart (DE)

( * ) Notice: Subject to any disclaimer, the term of this patent is extended or adjusted under 35 U.S.C. 154(b) by 112 days.

(21) Appl. No.: 11/349,882

(22) Filed: Feb. 8, 2006

(65) Prior Publication Data

US 2006/0185509 A1 Aug. 24, 2006

(30) Foreign Application Priority Data

Feb. 18, 2005 (FR) .................................. 05 01808

(51) Int. Cl.
*F15B 9/10* (2006.01)
(52) U.S. Cl. .................................. 92/169.2; 91/376 R
(58) Field of Classification Search ............... 92/169.2, 92/169.3, 169.4; 91/376 R, 369.1, 369.2, 91/369.3, 369.4; 60/552, 554
See application file for complete search history.

(56) References Cited

U.S. PATENT DOCUMENTS

| | | | |
|---|---|---|---|
| 4,377,069 A | 3/1983 | Koyayashi | |
| 4,783,964 A | 11/1988 | Fanelli | |
| 4,790,235 A | 12/1988 | Gautier | |
| 4,944,214 A * | 7/1990 | Briggs | ........................ 92/98 R |
| 5,072,996 A | 12/1991 | Heibel | |
| 5,447,030 A | 9/1995 | Wang et al. | |
| 5,878,650 A * | 3/1999 | Osterday et al. | ................ 92/48 |
| 6,050,174 A * | 4/2000 | Schonlau et al. | .......... 92/169.3 |
| 6,189,437 B1 | 2/2001 | Morlan | |
| 7,040,217 B1 * | 5/2006 | Wake | ........................ 92/169.2 |

* cited by examiner

*Primary Examiner*—Igor Kershteyn
(74) *Attorney, Agent, or Firm*—Leo H McCormick, Jr.; Sarah Taylor

(57) ABSTRACT

A tie rod (40) for mounting a booster and the brake control master cylinder on a bulkhead (3) of the vehicle engine compartment. The tie rod (4) comprises, at each of its ends, a shoulder (43, 44) defining a bearing surface having a frustoconical shape. Each shoulder is situated in such a way that a narrow part of its frustoconical surface is near a threaded part (41, 42) used to secure the booster and is located inside of the booster in such a way that each frustoconical surface is in contact with a corresponding frustoconical hole (81, 82) in a wall of the booster.

5 Claims, 2 Drawing Sheets

TIE ROD FOR BOOSTER AND BOOSTER COMPRISING SUCH A TIE ROD

BACKGROUND OF THE INVENTION

The invention relates to a vehicle brake booster tie rod. The invention also relates to a booster using such a tie rod.

Figure 1:
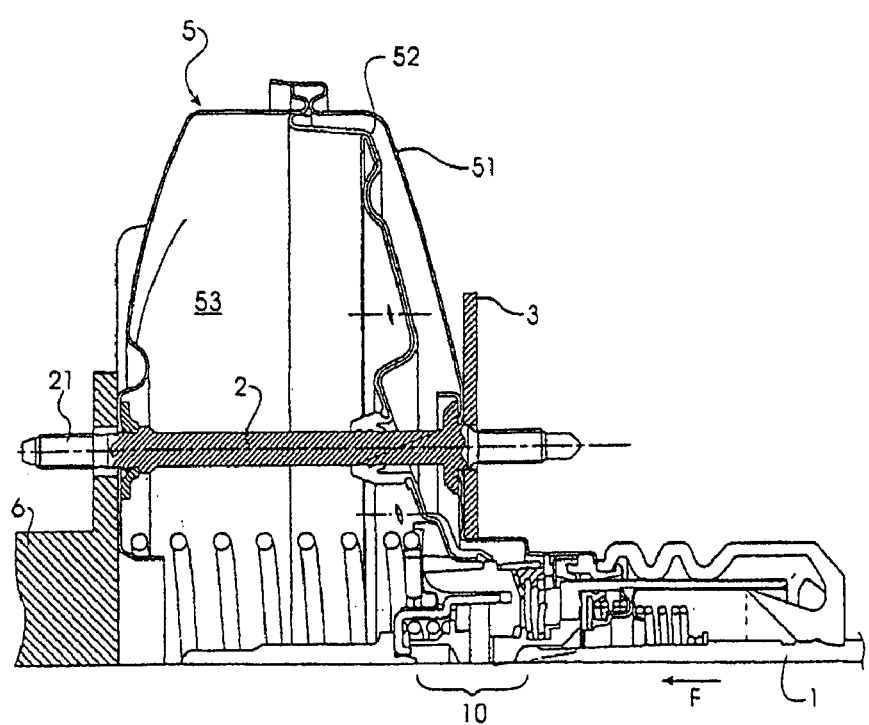

In a motor vehicle, the brake booster is generally positioned in the forward compartment of the vehicle, which is often the engine compartment. As depicted in FIG. 1, the booster casing comprises a front wall 50 and a rear wall 51. Inside the casing is the skirt 52 which, as is known in the art, allows forces F transmitted by a control rod 1 and a piston 10 to be passed on to a push rod which imparts the forces to the master cylinder 6.

It is known practice in the state of the art for the booster to be secured to the bulkhead dividing the forward compartment of the vehicle from the driver's compartment.

According to the method of attachment of FIG. 1, the securing means comprise rods or tie rods that pass right through the booster casing.

This method of attachment has the advantage that the tie rods such as 2 can comprise means for setting the distance between the front 50 and rear 51 walls of the booster and for thus axially stiffening the booster.

However, these tie rods pass through the front chamber 53 of the booster, in which chamber a vacuum is to be created so that the booster can, as is its purpose, afford the desired brake boost. There must therefore not be any leaks around these tie rods in the regions where they pass, on the one hand, through the front wall 50 of the booster and, on the other hand, through the skirt 52.

Furthermore, at its two ends, each tie rod has threaded parts 20 and 21 onto which nuts can be screwed. The threaded part 20 allows the booster to be secured to a bulkhead of the engine compartment and the threaded part 21 allows the master cylinder 6 to be secured to the booster.

As can be seen in FIG. 1, each tie rod is often crimped into the rear wall of the booster, and this may cause deformations at the time of crimping. In addition, the tightening of the securing nuts onto the threaded parts creates stress in the tie rods.

It is an object of the invention to solve these disadvantages.

BRIEF SUMMARY OF THE INVENTION

The invention therefore relates to a vehicle brake booster tie rod intended for securing a booster to the bulkhead of a vehicle compartment via a rear wall of the booster and for securing a brake control master cylinder on a front wall of said booster. The tie rod passes through the front and rear walls of the booster and comprises a first end having a first threaded part intended to be secured to said bulkhead of the vehicle compartment and a second end having a second threaded part intended to allow said master cylinder to be secured to the front wall of the booster. The tie rod comprises, at each of its ends, a shoulder exhibiting a bearing surface of frustoconical shape, each shoulder being situated in such a way that the narrow part of its frustoconical surface is near a threaded part and is intended to lie inside the booster in such a way that each frustoconical surface is intended to be in contact with a hole in a wall of the booster.

The invention also applies to a booster using such a tie rod. For preference, each hole in the walls of the booster has a frustoconical surface that complements the frustoconical surface of a shoulder of a tie rod.

Advantageously, each hole has an additional thickness possessing a frustoconical interior surface.

Each additional thickness may comprise a washer secured to one wall of the booster and the interior hole of which has a frustoconical surface.

This washer may be secured to a wall of the booster by bending the wall material back onto the frustoconical surfaces of the hole in the washer.

BRIEF DESCRIPTION DRAWINGS

The various characteristic objects of the invention will become more clearly apparent from the description which will follow and from the attached figures which depict:

FIG. 1: a tie rod securing system known from the prior art and described earlier, FIG. 2: one exemplary embodiment of a tie rod according to the invention and a booster using such a tie rod.

DETAILED DESCRIPTION OF THE INVENTION

Figure 2:
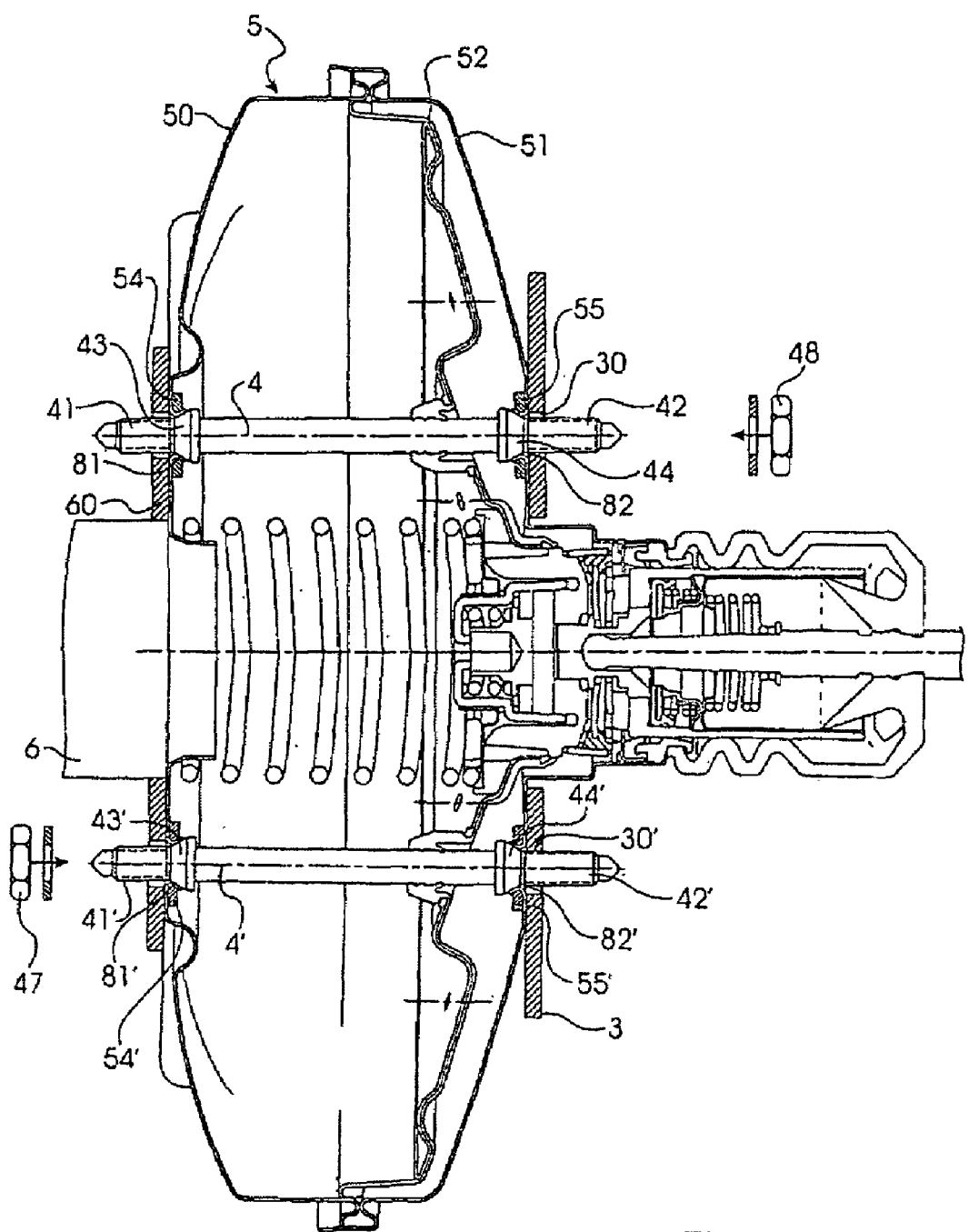

A system for securing a booster using tie rods according to the invention will therefore be described with reference to FIG. 2.

This FIG. 2 again shows the bulkhead 3 of the vehicle engine compartment to which the booster 5 and the master cylinder 6 that is to be secured to the booster are to be secured.

The booster has a casing which has a front wall 50 and a rear wall 51. Inside, there is the skirt 52 secured to the piston 10 and allowing the braking forces to be passed on to the brake master cylinder.

The rear wall 51 is the one that is to be held against the wall 3 of the engine compartment. The front wall 50 is the one to which the master cylinder 6 is to be secured.

Tie rods 4 and 4', the threaded ends 41-42 and 41'-42' of which pass through the walls 50 and 51, are positioned inside the booster. The ends 42 and 42' pass through the holes 30 and 30' in the bulkhead 3 of the engine compartment. Nuts, such as the nut 48, screwed onto the ends 42 and 42' secure the tie rods to the bulkhead 3.

Shoulders 44 and 44' are pressed against the rear wall 51 of the booster. These shoulders have a frustoconical surface the narrow part of which faces towards a threaded end (42, 42').

Furthermore, the rear wall 51 of the booster has, at the sites of the passages for the ends 42, 42' of the tie rods, holes 82, 82' exhibiting surfaces that are also frustoconical with shapes that complement those of the shoulders. Thus, the frustoconical surfaces of the shoulders can press perfectly against the frustoconical surfaces of these holes. These holes may have washers 55, 55', secured to the rear wall 51 and each having a frustoconical hole. The frustoconical shoulders therefore have a surface bearing against the surfaces of the holes 82, 82' in order both to immobilize the shoulders in these holes and to provide a perfect seal between the shoulders and the holes.

Likewise, shoulders 43 and 43' of frustoconical shape are also associated with the threaded ends 41 and 41'. The purpose of the threaded ends 41 and 41' is to secure a mounting base 60 of the master cylinder 6 to the front wall 50 of the booster using nuts such as the nut 47. The frustoconical surfaces of the shoulders 43 and 43' are pressed against holes 81, 81', also of frustoconical shape, provided in the front wall 50. The frustoconical holes 81, 81' are produced in the same way as the holes 82, 82' in the rear wall of the booster. The shoulders 43 and 43', by being pressed against the frustoconical holes, will also therefore be immobilized in the holes.

It can thus be seen that when mounting the booster on the bulkhead of the engine compartment and when mounting the master cylinder on the booster, the tightening of the nuts such as 47 and 48 onto the threaded parts 41-41' and 42-42' will have the effect of immobilizing the bases of the tie rods in the frustoconical holes in the walls of the booster. As a result, there will be no risk of the tie rods becoming deformed or twisted. In addition, the frustoconical surfaces will provide a perfect seal between the bases of the tie rods and the holes in the walls of the booster.

It should be noted that the washers 54-54' and 55-55' may be secured by bending the material of the walls of the booster back onto the frustoconical faces of the washers.

The system of the invention has the advantage of providing an easy-fit system for securing the booster.

In addition, the bearing surfaces, of frustoconical shape, of the shoulders of the tie rods and of the corresponding holes in the front and rear walls of the booster provide a metal-to-metal seal which is dependable.

It will also be noted that when tightening the nuts onto the threaded parts, the frustoconical surfaces of the shoulders of the tie rods and those of the holes in the walls of the booster will have a tendency to jam together. The tightening forces will therefore not be passed on to the tie rods.

Finally, the tie rods are symmetric, which is advantageous both from a manufacturing and from an assembly standpoint.

The invention claimed is:

1. A vehicle brake booster tie rod for securing a booster to the bulkhead (3) of a vehicle compartment via a rear wall of the booster (51) and for mounting a brake control master cylinder (6) on a front wall (50) of said booster, said tie rod (4) passing through the front and rear walls (50, 51) of the booster and comprising a first end having a first threaded part (42) secured to said bulkhead (3) of the vehicle compartment and a second end having a second threaded part (41) positioning said master cylinder (6) to be secured to the front wall (50) of the booster, wherein said tie rod (4) comprises, at each of its ends, a shoulder (43, 44) having a bearing surface of frustoconical shape, each shoulder (43, 44) being situated in such a way that the narrow part of its frustoconical surface is near a threaded part (41, 42) and lies inside the booster in such a way that each frustoconical surface is in contact with a hole (81, 82) in a wall of the booster.

2. The tie rod for the booster according to claim 1, wherein each hole (81, 82) in the walls (50, 51) of the booster has a frustoconical surface that complements the frustoconical surface of a shoulder (43, 44) of a tie rod.

3. The tie rod for the booster according to claim 2, wherein each hole (81, 82) has an additional thickness possessing a frustoconical interior surface.

4. The tie rod for the booster according to claim 3, wherein each additional thickness comprises a washer (54, 55) secured to one wall of the booster (50, 51) and the interior hole of which has a frustoconical surface.

5. The tie rod for the booster according to claim 4, wherein said washer (54, 55) is secured to a wall (50, 51) of the booster by bending the wall material back onto the frustoconical surfaces of the hole in the washer.

* * * * *